(No Model.)
W. S. DOE.
BATTERY CONNECTION.
No. 530,401. Patented Dec. 4, 1894.
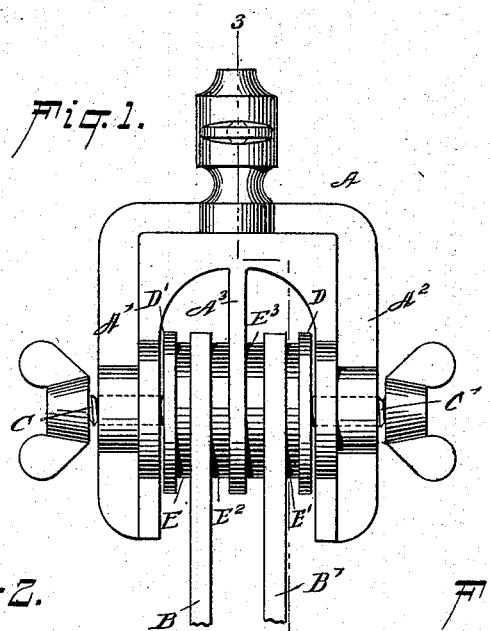
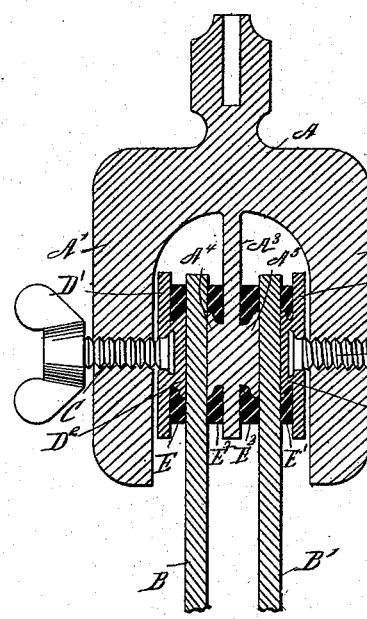
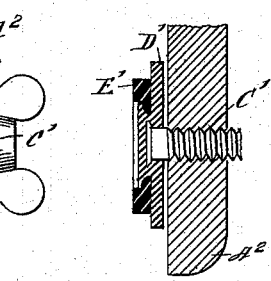
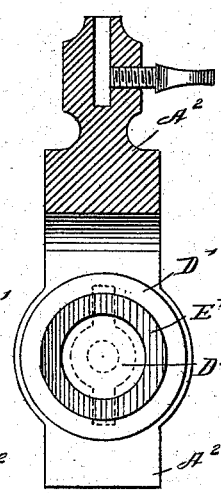
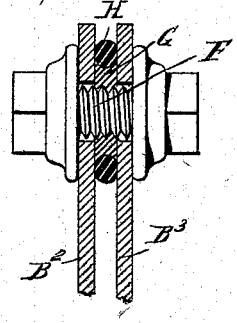
WITNESSES:
William Gaebel
Theo. G. Hoster
INVENTOR
W. S. Doe
BY Munn & Co
ATTORNEYS.

UNITED STATES PATENT OFFICE.

WALTER S. DOE, OF BROOKLYN, NEW YORK, ASSIGNOR OF ONE-HALF TO HENRY THOMPSON, OF SAME PLACE.

BATTERY CONNECTION.

SPECIFICATION forming part of Letters Patent No. 530,401, dated December 4, 1894.

Application filed August 27, 1894. Serial No. 521,429. (No model.)

*To all whom it may concern:*

Be it known that I, WALTER S. DOE, of Brooklyn, in the county of Kings and State of New York, have invented a new and Improved Battery Connection, of which the following is a full, clear, and exact description.

The invention relates to storage batteries of the lead plate type, and its object is to provide a new and improved battery connection by which a positive contact and separation of the lead plates are obtained, and the acid vapors are prevented from affecting the contacting surfaces.

The invention consists of a contacting disk surrounded by an elastic ring, for hermetically sealing the joint between the face of the disk and the lead plate.

The invention also consists of certain parts and details and combinations of the same, as will be fully described hereinafter and then pointed out in the claims.

Reference is to be had to the accompanying drawings, forming a part of this specification, in which similar letters of reference indicate corresponding parts in all the figures.

Figure 1 is a side elevation of the improvement. Fig. 2 is a sectional side elevation of the same. Fig. 3 is a transverse section of the same on the line 3—3 of Fig. 1. Fig. 4 is a sectional side elevation of the disk and ring out of contact with the plate; and Fig. 5 is a sectional side elevation of a modified form of the improvement.

As illustrated in Figs. 1, 2, and 3, the battery connection is provided with a metallic head A, provided with two side arms $A'$ and $A^2$ and a division plate $A^3$, between which and the said arms are arranged the lead plates or lugs B and $B'$. In the side arms $A'$ and $A^2$ screw the screws C and $C'$ respectively, supporting on their inner ends the disks D and $D'$ respectively, each provided with a reduced central disk $D^2$ and $D^3$ respectively, adapted to engage the corresponding outer faces of the lead plates or lugs B and $B'$, to establish a contact between the plates or lugs, the disk, screw and head. The opposite or inner faces of the plates or lugs B and $B'$ are engaged by correspondingly shaped disks $A^4$, $A^5$ respectively, formed integrally on opposite sides of the partition $A^3$, as is plainly shown in Fig. 2.

The several disks $D^2$, $D^3$, $A^4$ and $A^5$, are preferably undercut or beveled and carry rings E, $E'$ $E^2$ and $E^3$ respectively, made of an elastic material, such as rubber, wax, composition or other material and of a thickness somewhat greater than the thickness of the corresponding disk, as indicated in Fig. 4.

Now, it will be seen that when the screws C and $C'$ are screwed outward, then sufficient space is left between the adjacent rings E, $E^2$ and $E^3$, $E'$, for inserting the lead plates B and $B'$, and in order to then make contact, the screws C or $C'$ are screwed up so that the elastic rings are compressed on the faces of the plates B, $B'$, the disks D, $D'$, and the opposite faces of the projection $A^3$, as is plainly shown in Fig. 2, while at the same time the disks $D^2$, $D^3$ and $A^4$, $A^5$ move in firm contact with opposite faces of the plates B and $B'$ respectively.

Now it will be seen that by the compression of the elastic rings the joint between the said disks and the plates B and $B'$ is hermetically sealed, so that vapors, acid or other fluid cannot pass to the contacting surfaces of the plates and disks, and hence the said four contacting surfaces form a positive connection not liable to be spoiled by corrosion or in any other shape or form whatever. It will further be seen that the plates B and $B'$ are securely clamped in position on the head A, and the said plates are held suitable distances apart, as is plainly indicated in the drawings, and the batteries can be disconnected almost in an instant.

As illustrated in Fig. 5, the two lead plates or lugs $B^2$ and $B^3$ are connected with each other by a bolt F surrounded, between the said plates, by a contacting washer G, engaging the inner faces of the said plates $B^2$ and $B^3$, the said washer being surrounded by a ring H of an elastic material, or composition, so as to be compressed on screwing up the bolt F, to hermetically seal the two joints formed by the washer G with the inner surfaces of the plates $B^2$ and $B^3$.

It is understood that I do not limit myself to any especial shape or form of the contacting disks, as the same may be varied, it being understood that whatever contacting surface is employed to make connection with the lead plates and to form a joint therewith, the said joint is covered and hermetically sealed by an elastic ring or composition compressed in the manner above described.

Having thus fully described my invention, I claim as new and desire to secure by Letters Patent—

1. A battery connection, comprising an electrical contact disk surrounded by an elastic ring, for hermetically sealing the joint between the face of the disk and the lead plate, and a binding post or head in electrical connection with said disk substantially as shown and described.

2. A battery connection, comprising an electrical contact disk, and an elastic ring surrounding the said disk and of a thickness somewhat greater than the thickness of the disk, and projecting beyond the face or faces of the disk, and a binding post or head in electrical connection with said disk substantially as shown and described.

3. A battery connection, comprising an electrical contact disk, an elastic ring surrounding the said disk and of a thickness somewhat greater than the thickness of the disk, and projecting beyond the face or faces of the disk, and means, substantially as described, for moving the said contact disk into contact with the lead plate, and at the same time compressing the elastic ring to cause the latter to hermetically seal the joint between the face of the disk and the lead plate, and a binding post or head in electrical connection with said disk as set forth.

4. A battery connection, comprising a head having side arms, and a transverse partition provided with integral disks, movable disks adapted to engage the lead plates, to press the same in contact with the said fixed disks on the partition, and elastic rings surrounding the said disks and adapted to hermetically seal the joints between the faces of the said disks and the lead plates, substantially as shown and described.

5. A battery connection, comprising a head having side arms, and a transverse partition provided with integral disks, movable disks adapted to engage the lead plates, to press the same in contact with the said fixed disks on the partition, elastic rings surrounding the said disks and adapted to hermetically seal the joints between the faces of the said disks and the lead plates, and screws screwing in the side arms of the head and carrying the said movable disks, substantially as shown and described.

WALTER S. DOE.

Witnesses:
   THEO. G. HOSTER,
   JNO. M. RITTER.